United States Patent
Kumar

(10) Patent No.: US 11,145,368 B2
(45) Date of Patent: Oct. 12, 2021

(54) METHOD AND SYSTEM FOR RELIABLE AND SECURE MEMORY ERASE

(71) Applicant: Microchip Technology Incorporated, Chandler, AZ (US)

(72) Inventor: Ajay Kumar, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/919,177

(22) Filed: Jul. 2, 2020

(65) Prior Publication Data

US 2021/0210140 A1 Jul. 8, 2021

Related U.S. Application Data

(60) Provisional application No. 62/957,541, filed on Jan. 6, 2020.

(51) Int. Cl.
*G11C 13/00* (2006.01)

(52) U.S. Cl.
CPC ...... *G11C 13/0097* (2013.01); *G11C 13/0038* (2013.01)

(58) Field of Classification Search
CPC .......... G11C 13/0097; G11C 13/0038
See application file for complete search history.

(56) References Cited

U.S. PATENT DOCUMENTS

| | | | |
|---|---|---|---|
| 6,301,156 B1 * | 10/2001 | Kurosaki | G11C 11/5621 365/185.2 |
| 9,007,814 B1 | 4/2015 | Derhacobian | 365/153 |
| 2002/0000871 A1 * | 1/2002 | Davies | G11C 16/30 327/540 |
| 2002/0136049 A1 * | 9/2002 | Choi | G11C 11/22 365/145 |
| 2005/0128779 A1 * | 6/2005 | Roehr | G11C 11/22 365/145 |
| 2011/0026299 A1 * | 2/2011 | Kanno | G11C 13/0061 365/148 |
| 2012/0243293 A1 * | 9/2012 | Takashima | G11C 13/0097 365/148 |
| 2018/0225249 A1 | 8/2018 | Lambourne et al. | |

FOREIGN PATENT DOCUMENTS

| | | | |
|---|---|---|---|
| EP | 0616368 A2 | 9/1994 | G11C 16/04 |
| WO | 2010/078483 A1 | 7/2010 | G11C 13/00 |

OTHER PUBLICATIONS

International Search Report and Written Opinion, Application No. PCT/US2020/040917, 12 pages, dated Oct. 19, 2020.

* cited by examiner

*Primary Examiner* — Khamdan N. Alrobaie
(74) *Attorney, Agent, or Firm* — Slayden Grubert Beard PLLC

(57) ABSTRACT

A memory device has a switch matrix with a power supply input, a control input and a power supply output, a random access memory with a power supply connection coupled with the power supply output of the switch matrix. The switch matrix has a capacitor being chargeable by a power supply and upon receiving a control signal through the control input, the switch matrix is designed to decouple the capacitor from the power supply and the random access memory and to couple the capacitor through the power supply output with the random access memory in reverse polarity thereby providing a negative power supply to the power supply output.

23 Claims, 3 Drawing Sheets

METHOD AND SYSTEM FOR RELIABLE AND SECURE MEMORY ERASE

PRIORITY CLAIM

This application claims benefit of priority of U.S. Provisional Application No. 62/957,541 filed on Jan. 6, 2020, which is hereby incorporated by reference as though fully and completely set forth herein.

TECHNICAL FIELD

The present disclosure relates to memories, in particular memories embedded, for example, in a microcontroller.

BACKGROUND

Microcontrollers or embedded systems may comprise a dedicated random access memory (RAM) block that stores intermediate and sensitive data. RAM memories are often split in several segments based on their use case; one such use case is storing secure information. As opposed to Flash memory, such a dedicated RAM block may provide the sensitive data faster to the central processing unit. Such a dedicated RAM block is usually not accessible for a user. FIG. 1 shows a typical embedded system 100 comprising a central processing unit (CPU) or a hardware security module (HSM) 120 coupled with a system RAM block 130. The RAM block 140 for storing sensitive security data, such as sensitive security KEY information, hereinafter named Trust RAM block 140, is separate from the system RAM block 130. Either the CPU or HSM 120 or the Trust RAM block 140 may include logic that prohibits general access to the Trust RAM block 140. In addition, a tamper detector or sensor unit 110 may be included that indicates to the CPU or HSM 120 or to a device external to the embedded system 100 any attempt of tampering with the embedded system 100. In response to such an attempt, the embedded system 100 is configured to erase the Trust RAM block 140.

Conventional systems erase Trust RAM block 140 by writing '1' and '0' to the entire Trust-RAM block 140 to ensure that all bits are overwritten. However, such a process takes a long time which is undesirable. Conventional methods to erase Trust RAM block 140, for example a 1 kB to 8 kB RAM block, takes milliseconds and are not reliable. Conventional methods can be altered in the middle by a simple activity such as supply and clock tamper, which can make the key or keys vulnerable.

Another method of erase Trust RAM block 140 may comprise the shorting of the supply for the Trust RAM block 140 to ground. Unfortunately, near the threshold voltage Vth, the transistor gates of erase Trust RAM block 140 discharge at a slower rate which results in a long time for the supply input lead to discharge. One can interrupt the erase attempt before it is complete, and read differential charge on the bit cells of Trust RAM block 140 while the supply voltage is still between Vdd~Vth, and thus potentially recover the information stored in Trust RAM block 140.

SUMMARY

Hence, there exists a need for an improved method and system to reliably erase a secure memory, in particular a secure random access memory.

According to an embodiment, a memory device may comprise a switch matrix comprising a power supply input, a control input and a power supply output, a random access memory having a power supply connection coupled with the power supply output of the switch matrix, wherein the switch matrix comprises a capacitor being chargeable by a power supply coupled to the power supply input and wherein upon receiving a control signal through the control input, the switch matrix is designed to decouple the capacitor from the power supply input and the power supply output and to couple the capacitor through the power supply output with the random access memory in reverse polarity.

According to a further embodiment, the random access memory can be a secure random access memory within an embedded system. According to a further embodiment, the switch matrix may comprise a first set of switches coupling the capacitor with the power supply input and a second set of switches for coupling the capacitor with the power supply output. According to a further embodiment, the second set of switches may comprise a first pair of switches configured to couple the capacitor with the power supply output in a first polarity and a second pair of switches configured to couple the capacitor with the power supply output in a second polarity, wherein the second polarity is a reverse polarity with respect to the first polarity. According to a further embodiment, the switch matrix can be controlled during normal operation to keep the first set of switches and the first pair of switches of the second set of switches closed while keeping the second pair of switches of the second set of switches open. According to a further embodiment, upon receiving the control signal, the switch matrix can be configured to open the first pair of switches of the second set of switches and the first set of switches and thereafter to close the second pair of switches of the second set of switches. According to a further embodiment, switches of the second set of switches can be controlled by a single switch control signal, wherein the first pair of switches is designed to operate faster than the second pair of switches. According to a further embodiment, the first pair of switches can be controlled by a first switch control signal and the second pair of switches is controlled by a second switch control signal, wherein for reversing a polarity of the capacitor, the first switch control signal is configured to be asserted before the second switch control signal. According to a further embodiment, switches of the first set of switches can be controlled to open after the first pair of switches of the second set of switches. According to a further embodiment, the capacitor may have a capacitance of about 10 times a total bit-cell capacitance of the random access memory. According to a further embodiment, switches for coupling the capacitor in reverse polarity can be sized for 3-c (tau).

According to another embodiment, a microcontroller may comprise a memory device as defined above, wherein the microcontroller forms the embedded system. According to yet another embodiment, a hardware security module may be coupled with such a memory device.

According to yet another embodiment, a method for operating a memory device, may comprise: supplying a random access memory with a supply voltage via a switch matrix, wherein the switch matrix comprises a power supply input, a power supply output and a capacitor being charged by the supply voltage; receiving a control signal indicating to erase the memory, and upon receipt of the control signal to erase the memory, decoupling the capacitor from the power supply and the random access memory through the switch matrix and thereafter coupling the capacitor with the power supply output in reverse polarity.

According to a further embodiment of such a method, the random access memory can be a secure random access memory within an embedded system. According to a further embodiment of such a method, the switch matrix may comprise a first set of switches coupling the capacitor with the power supply input and a second set of switches for coupling the capacitor with the power supply output, wherein the second set of switches comprises a first pair of switches configured to couple the capacitor with the power supply output in a first polarity and a second pair of switches configured to couple the capacitor with the power supply output in a second polarity, wherein the second polarity is a reverse polarity with respect to the first polarity. According to a further embodiment of such a method, the method may further comprise when the control signal is not received, controlling the first set of switches and the first pair of switches of the second set of switches to be closed while keeping the second pair of switches of the second set of switches open. According to a further embodiment of such a method, upon receiving the control signal, the method may provide for controlling the first pair of switches of the second set of switches and the first set of switches to open and thereafter to close the second pair of switches of the second set of switches. According to a further embodiment of such a method, switches of the second set of switches can be controlled by a single switch control signal, wherein the first pair of switches is designed to operate faster than the second pair of switches. According to a further embodiment of such a method, the first pair of switches can be controlled by a first switch control signal and the second pair of switches is controlled by a second switch control signal, wherein for reversing a polarity of the capacitor, the first switch control signal is asserted before the second switch control signal. According to a further embodiment of such a method, switches of the first set of switches can be controlled to open after the first pair of switches of the second set of switches are controlled to open. According to a further embodiment of such a method, the capacitor may have a capacitance of about 10 times a total bit-cell capacitance of the random access memory. According to a further embodiment of such a method, switches for coupling the capacitor in reverse polarity can be sized for 3τ (tau).

DETAILED DESCRIPTION

According to an embodiment, a reliable erase function to such a Trust RAM block may apply a negative supply voltage to its power supply. However, as these systems are often CMOS devices, it may be difficult and expensive to generate a negative supply in a CMOS process.

According to various embodiments, a memory device has a switch matrix with a power supply input, a control input and a power supply output, a random access memory block with a power supply connection coupled with the power supply output of the switch matrix. The switch matrix has a capacitor being chargeable by a power supply and upon receiving a control signal through the control input, the switch matrix is designed to decouple the capacitor from the power supply and the random access memory block and to couple the capacitor through the power supply output with the random access memory block in reverse polarity thereby providing a negative power supply to the power supply output.

According to various embodiments, a set of series switches is used to provide a power supply to the Trust RAM block. These switches allow the system to isolate the trust RAM block power supply. The Trust RAM block is accompanied with a decoupling capacitor that provides for a sufficient decoupling capacitance. Once the decoupling capacitor is charged and isolated, another set of switches can be used which flips the decoupling capacitor connected to supply power for the Trust RAM block. With it, the decoupling capacitor acts like a battery to the Trust-RAM block. Flipping the decoupling capacitor, acts like applying a negative battery voltage to the Trust-RAM block supply input. Thus, the Trust RAM block is erased rapidly.

The advantages of the solution enabled herein is that it can erase the Trust RAM block with 3 times constant of RC time constant of switch and the decoupling-values. The Trust RAM block erase time with the embodiments enabled herein is more reliable than writing "1" and '0' to RAM and is over 1000× faster. The bigger the RAM, the faster the erasing will be with respect to the conventional solution of writing '0' and '1' to the entire RAM.

Figure 2:
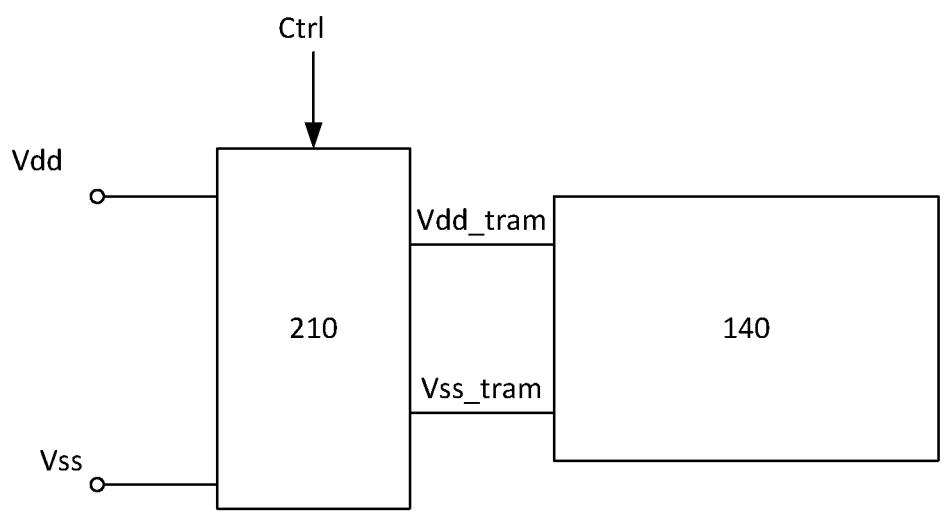
FIG. 2 shows an embodiment of an improved secure RAM block with fast erasure function.

FIG. 2 shows an embodiment of an improved secure RAM or Trust RAM block 140. A power supply providing voltages on supply lines Vdd, Vss is provided for the Trust RAM block 140, for example by a dedicated voltage regulator (not shown). This power supply may be a common supply that is used for various other parts of the embedded system or may be a dedicated power supply that only provides power to the Trust RAM block 140. A switch matrix 210 is coupled between the power supply lines Vdd, Vss and the Trust RAM block 140, such that power supply lines Vdd, Vss are coupled to the power supply input of switch matrix 210. The switch matrix 210 is configured to provide, under control of the secure element or CPU or HSM 120, a negative voltage to the Trust RAM block 140. In normal operation, switch matrix 210 connects the Vdd supply line coupled to the power supply input of switch matrix 210 with the Vdd_tram line of the power supply output of switch matrix 210 coupled to the respective power supply connection of Trust RAM block 140 and the Vss supply line coupled to the power supply input of switch matrix 210 with the Vss_tram line of the power supply output of switch matrix 210 coupled to the respective power supply connection of the Trust RAM block 140, and thus a positive voltage is supplied to Trust RAM block 140 across the lines Vdd_tram and Vss_tram at a power supply connection of the Trust RAM block 140. When the switch matrix 210 receives an asserted control signal through line Ctrl indicating that the Trust RAM block 140 is to be erased, switch matrix 210 provides a negative voltage supply across the lines Vdd_tram and Vss_tram coupled to the power supply connection of the Trust RAM block 140. To this end, switch matrix 210 may comprise a capacitor that is charged by the power supply provided between the power supply lines Vdd, Vss and which capacitor can be switchably separated from the power supply lines Vdd, Vss. The switch matrix 210 further includes switches that allow to flip the capacitor polarity with respect to the lines Vdd_tram, Vss_tram, i.e. with respect to the power supply output of the switch matrix 210. Thus, an inverted or negative supply voltage is provided to the lines Vdd_tram, Vss_tram which causes a rapid erasure of the Trust RAM block 140.

Figure 1:
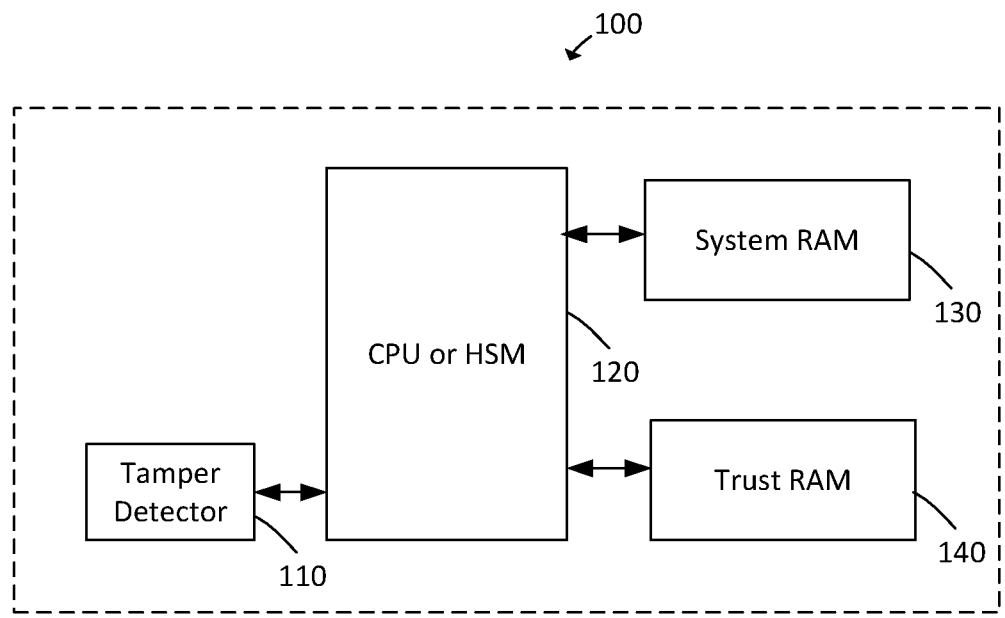
FIG. 1 shows a conventional embedded system with a secure RAM block.
Figure 3:
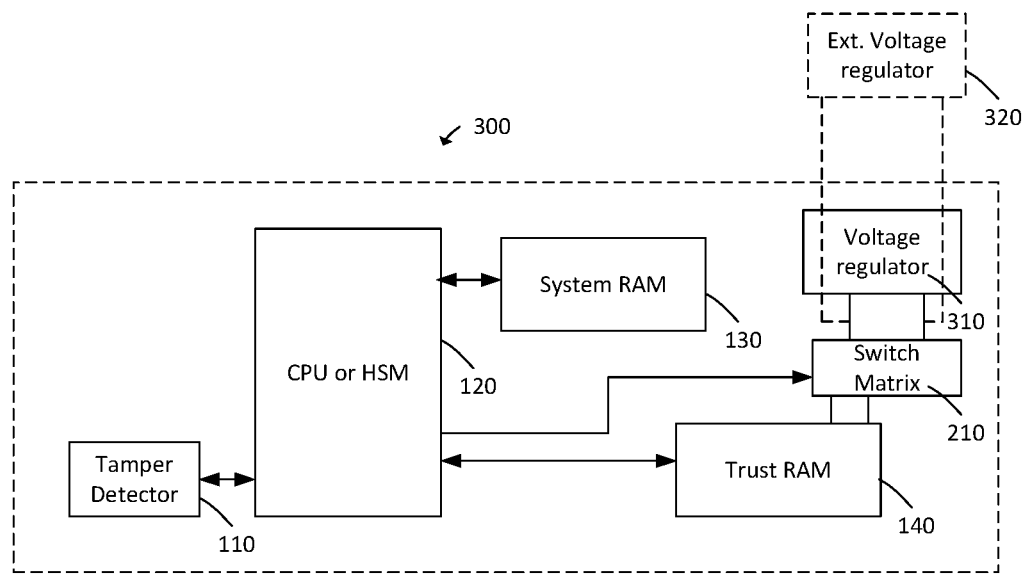
FIG. 3 shows an embedded system with a secure RAM block according to an embodiment.

FIG. 3 shows an embodiment of how the switch matrix 210 is embedded within an embedded system 300. Similar elements from FIG. 1 carry similar or the same reference numbers in FIG. 3. FIG. 3 is similar to the embedded system of FIG. 1 with a voltage regulator 310 which may be present on the embedded system 300 providing a power supply for the Trust RAM block 140 through the switch matrix 210. Voltage regulator 310 may also provide power to other components of the embedded system 300. However, the supply voltage for the Trust RAM block 140 may also be provided externally as indicated by the dotted lines and provided by external voltage regulator 320. The switch matrix 210 is arranged between the voltage regulator 310 and the Trust RAM block 140 and receives a control signal from the CPU or HSM 120. In the event that the supply voltage for the Trust RAM block 140 is provided by external voltage regulator 320, the switch matrix 210 is arranged between the external voltage regulator 320 and the Trust RAM block 140. The switch matrix 210 has a power supply input coupled with the output of voltage regulator 310 and further has a power supply output coupled with a power supply connection of Trust RAM block 140. Furthermore, switch matrix 210 has a control input receiving a control signal from CPU or HSM 120.

During normal operation, the switch matrix 210 is controlled by the de-asserted state of the control signal from CPU or HSM 120 to provide the output of voltage regulator 310 or 320 to the power supply line connection of the Trust RAM block 140. When tampering is detected by tamper detector 110, responsive to a signal from tamper detector 110 the CPU or HSM 120 asserts the control signal to the switch matrix 210 which causes the switch matrix 210 to provide an inverted or negative power supply to the power supply connection to the Trust RAM block 140 thereby erasing the entire contents of Trust RAM block 140. Tampering may be detected by the tamper detector 110, for example, to generate an internal tamper event signal sent to CPU or HSM 120 upon detection of a power supply glitch, a clock glitch, a temperature out of range event, a voltage out of range event, or by detection of decapsulation of the module or integrated circuit, etc. Similarly, other possible tamper events may be detected by tamper detector 110. Once such a tamper event has been detected by tamper detector 110, preferably the contents of Trust RAM block 140 is erased as rapidly as possible. The rapid erasing of the contents of Trust RAM block 140 is accomplished by the provision of the inverted or negative power supply output of switch matrix 210 coupled to the power supply connection of the Trust RAM block 140.

Figure 4:
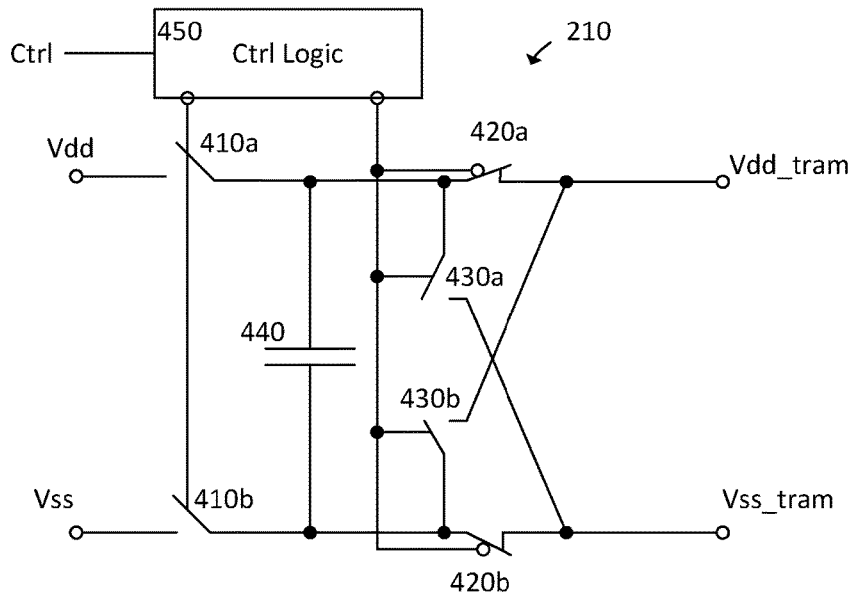
FIG. 4 shows a first embodiment of a switch matrix.

FIG. 4 shows a first embodiment of the switch matrix 210. A first set of switches, comprising switches 410a and 410b can couple the supply voltage received through power supply lines Vdd and Vss to respective leads of a capacitor 440. A second set of switches comprising a first pair of switches 420a,b and a second switch pair 430a,b, respectively can be controlled to provide the voltage across the leads of capacitor 440 to the output lines Vdd_tram and Vss_tram of the power supply output of the switch matrix 210 in one of: a first polarity, matching the polarity of power supply lines Vdd, Vss, when first pair of switches 420a,b are closed and second switch pair 430a,430b are open; and in a second polarity, opposite the first polarity, when first pair of switches 420a,b are open and second switch pair 430a,430b are closed, which output lines Vdd_tram and Vss_tram tram of the power supply output of the switch matrix 210 are connected to the power supply connection of the Trust RAM block 140. Control logic 450 may generate the necessary control signal for switch pairs 410, 420, and 430.

In the embodiment of FIG. 4, the first set of switches comprising switches 410a,b, are in series with the power supply input lines Vdd, Vss, respectively, and are used to disconnect the capacitor 440 from the power supply lines Vdd, Vss, and a second set of switches comprising the first pair of switches 420a,b, respectively arranged in series so as to connect the capacitor 440, in the first polarity, to power input lines Vdd_tram, Vss_tram and the second pair of 430a,b, respectively arranged as series cross switches, to flip the polarity of capacitor 440 in relation to power input lines Vdd_tram, Vss_tram. Thus, when the first pair of switches 420a,b are closed and the second pair of switches 430a,b are open, a first terminal of capacitor 440 is coupled with line Vdd_tram and a second terminal of capacitor 440 is coupled with line Vss_tram. When the first pair of switches 420a,b are open and the second pair of switches 430a,b are closed, the first terminal of capacitor 440 is coupled with line Vss_tram and the second terminal of capacitor 440 is coupled with line Vdd_tram. Thus, the first set of switches 410a,b is used to couple the capacitor 440 with the power supply lines Vdd, Vss and the second set of switches 420a,b and 430a,b is configured to alternately couple the capacitor 440 with the power supply output Vdd_tram, Vss_tram in a first polarity and in a second polarity, wherein the second polarity is a reverse polarity with respect to the first polarity.

In order to preserve the charge on decoupling capacitor 440, the second set of switches 420a,b and 430a,b are flipped in "Break before Make" fashion. First, the power supply lines Vdd, Vss are disconnected by first set of switches 410a,b. In order to reverse polarity, first pair of switches 420a,b are then opened. Preferably, first set of switches 410a,b are opened shortly before first pair of switches 420a,b are opened. After decoupling of the capacitor 440 from the power supply lines Vdd, Vss, the decoupling capacitor 440 is flipped and the flipped capacitor 440 is then connected back to provide power to Trust RAM block 140 at the power supply connection of Trust RAM block 140, i.e. the flipped capacitor 440 is then connected to lines Vdd_tram, Vss_tram. This can be accomplished by designing first pair switches 420a,b to be faster than the second pair of switches 430a,b, or by providing a delay between the output of control logic 450 and the control input of the second pair of switches 430a,b. Thus, according to one embodiment, once first set of switches 410a,b are open, first pair of switches 420a,b are controlled to open and second pair of switches 430a,b are controlled to close. Due to the specific design of first pair of switches 420a,b acting faster than second pair of switches 430a,b, capacitor 440 is first separated from the outputs Vdd_tram and Vss_tram. Then, after a short delay, second pair of switches 430a,b are closed thereby flipping capacitor 440 with respect to the output Vdd_tram and Vss_tram and providing a negative voltage stored on capacitor 440 to the power supply connection of Trust RAM block 140.

Figure 5:
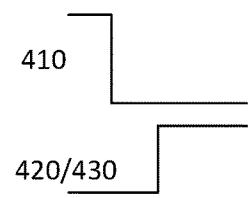
FIG. 5 shows a timing diagram of switch control signals used in the first embodiment.

Control logic 450 may receive a single control signal from the CPU or HSM 120 and may be designed to provide the respective delays for the first switch control signal for first set of switches 410a,b and the second switch control signal for first pair of switches 420a,b and second pair of switches 430a,b. As shown in FIG. 4, first pair of switches 420a,b shown with an inverter symbol are designed to operate inversely with respect to second pair of switches 430a,b, in other words when the second switch control signal from control logic 450 is in a state in which first pair of switches 420a,b are controlled to open second pair of switches 430a,b are controlled to close and when the second switch control signal from control logic 450 is in a state in which first pair of switches 420a,b are controlled to close second pair of switches 430a,b are controlled to open. Furthermore, first pair of switches 420a,b are designed to act faster in opening than the closing of second pair of switches 430a, b to provide for the necessary "break before make" functionality. FIG. 5 also shows an example of possible first and second control signals for switches 410 and switches 420/430 wherein the first and second pairs of switches 420a,b and 430a,b operate with the above-mentioned delay. FIG. 5 shows the respective timing diagram wherein a logic high for the first control signal controls first set of switches 410a,b to be closed, and a logic low for the first control signal controls first set of switches 410a,b to open. A logic low for the second control signal controls first pair of switches 420a, b to be closed and a logic high for the second control signal controls first pair of switches 420a,b to be opened. The timing diagram shows the short delay between switching of the first set of switches 410a,b and the second set of switches 420a,b, 430a,b. The delay between the first pair of switches 420a, b and the second pair of switches 430a,b is inherent as explained above.

Alternatively, instead of control logic 450, the CPU may provide a separate first control signal for first set of switches 410a, b and a separate second control signal for each of the first pair of switches 420a,b, and second pair of switches 430a,b, as described below in relation to FIGS. 6 and 7.

Figure 6:
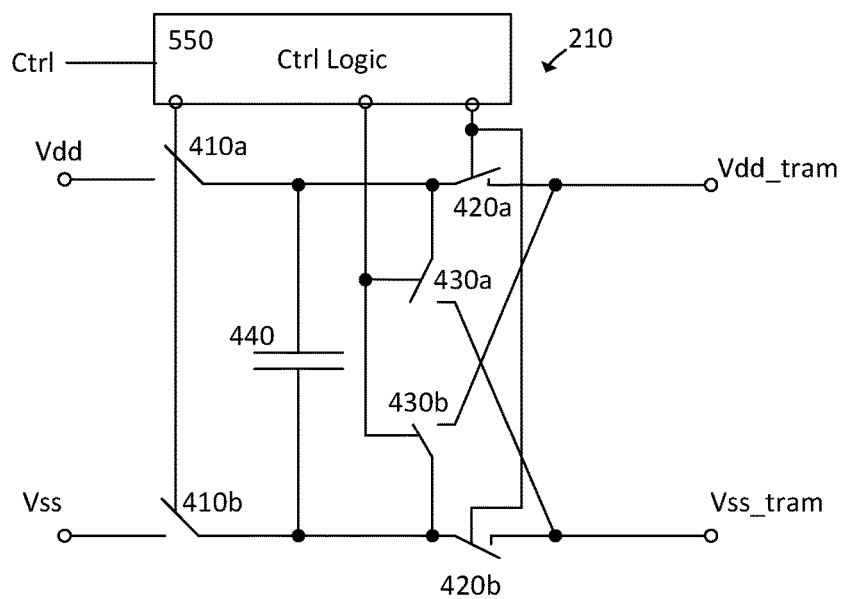
FIG. 6 shows a second embodiment of a switch matrix.
Figure 7:
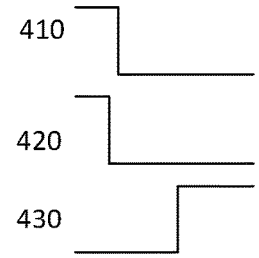
FIG. 7 shows a timing diagram of switch control signals used in the second embodiment.

FIG. 6 shows a further embodiment of the switch matrix 210 which operates similar to the one shown in FIG. 4. Here, first pair of switches 420a,b and second pair of switches 430a, b do not receive the same control signal from control logic 550 but are controlled by separate switch control signals which can be provided by control logic 550 or directly by CPU or HSM 120. In this embodiment, all switches may be designed to operate similarly. As first pair of switches 420a,b and second pair of switches 430a,b are controlled separately, the control signals are generated with the necessary delays by control logic 550 or by the CPU of HSM 120. In the embodiment of FIG. 6, during normal operation, first set of switches 410a,b and first pair of switches 420a,b are controlled to be closed and second pair of switches 430a,b are controlled to be open. Once, tampering has been detected, first pair of switches 410a,b and first pair of switches 420a,b are opened to isolate capacitor 440. Timing between the opening of first set of switches 410a,b and first pair of switches 420a,b is less critical but, preferably, first pair of switches 420a,b are opened shorty before first set of switches 410a,b are opened. Once, capacitor 440 is isolated from the power supply, and from power supply outputs of lines Vdd_tram and Vss_tram, second pair of switches 430a,b are closed to apply a negative supply voltage to the power supply connection of Trust RAM block 140. FIG. 7 also shows an example of possible first, second, and third control signals for first set of switches 410a,b, first pair of switches 420a,b and second pair of switches 430a,b. A logic high on a respective switch control signal controls the respective switches 410a,b, 420a,b, and 430a,b to be closed and a logic low controls them to be open. As shown here the second control signal controlling first pair of switches 420a,b transitions shortly before the control signal controlling first set of switches 410a,b. However, the control signal for first pair of switches 420a,b may also be designed to transition shortly after first set of switches 410a,b transitions.

The capacitor 440 may be designed to have a capacitance of about 10 times the total bit-cell capacitance of the Trust memory block 140 according to one embodiment. However, other factors may apply. At least the second switch set for reversing the polarity may be preferably sized for $3\tau$ (tau) in Tclk according to one embodiment. However, all switches in the switch matrix may be sized for $3\tau$ (tau). By setting the capacitance of capacitor 440 to be ten times the total bit-cell capacitance of the Trust memory block 140 ensures that once the capacitor 440 is coupled to the power supply connection of Trust memory block 140 in the reverse polarity, it has sufficient charge to neutralize the charge inside the RAM bit cells of Trust memory block 140. Since the objective is to rapidly discharge the RAM bit cells charge, according to one embodiment, the capacitor 440, which may be considered a decoupling capacitor, should exhibit a capacitance of at least 2× the total bit-cell capacitance of the Trust memory block 140, as 1× will only make it charge neutral. Since the decoupling capacitor values are bigger than the capacitors of the RAM bit cells of Trust memory block 140, the overall time constant is defined by the resistance of the second pair of switches 430a,b and the capacitance of capacitor 440. In $3\tau$ (tau) time constant, the overall charge will neutralize up to 95% of its final value, which will be well below the threshold voltage of the transistors and will therefore be hard to detect.

The decoupling capacitor 440 is used as a battery source. Responsive to the action of first and second pairs of switches 420a,b and 430a,b polarity is reversed at the power supply output of switch matrix 210 and the resulting voltage is applied to the power supply connection of Trust RAM block 140. The embodiments shown in FIGS. 4 and 6 allow the entire Trust RAM block 140 erasure to be achieved in a single clock cycle, which can be defined by a security macro clock or a system clock. The timing for controlling switches 410, 420 and 430 can be separated by one or more clock cycles based on system implementation.

The mechanism enabled in the various embodiments is not limited to secure random access memories but may be used with any type of volatile memory in any type of system, in particular systems that may require a fast erasure function for the volatile memory.

The invention claimed is:

1. A memory device, comprising:
   a switch matrix comprising a power supply input, a control input and a power supply output,
   a random access memory having a power supply connection coupled with the power supply output of the switch matrix,
   wherein the switch matrix comprises a capacitor being chargeable by a power supply coupled to the power supply input and wherein upon receiving a control signal through the control input, the switch matrix is designed to decouple the capacitor from the power supply input and the power supply output and to couple the capacitor through the power supply output with the random access memory in reverse polarity.

2. The memory device according to claim 1, wherein the random access memory is a secure random access memory within an embedded system.

3. The memory device according to claim 1, wherein the switch matrix comprises a first set of switches coupling the capacitor with the power supply input and a second set of switches for coupling the capacitor with the power supply output.

4. The memory device according to claim 3, wherein the second set of switches comprises a first pair of switches configured to couple the capacitor with the power supply output in a first polarity and a second pair of switches configured to couple the capacitor with the power supply output in a second polarity, wherein the second polarity is a reverse polarity with respect to the first polarity.

5. The memory device according to claim 4, wherein the switch matrix is controlled during normal operation to keep the first set of switches and the first pair of switches of the second set of switches closed while keeping the second pair of switches of the second set of switches open.

6. The memory device according to claim 5, wherein upon receiving the control signal, the switch matrix is configured to open the first pair of switches of the second set of switches and the first set of switches and thereafter to close the second pair of switches of the second set of switches.

7. The memory device according to claim 6, wherein switches of the second set of switches are controlled by a single switch control signal, wherein the first pair of switches is designed to operate faster than the second pair of switches.

8. The memory device according to claim 6, wherein the first pair of switches is controlled by a first switch control signal and the second pair of switches is controlled by a second switch control signal, wherein for reversing a polarity of the capacitor, the first switch control signal is configured to be asserted before the second switch control signal.

9. The memory device according to claim 6, wherein switches of the first set of switches are controlled to open after the first pair of switches of the second set of switches.

10. The memory device according to claim 1, wherein the capacitor has a capacitance of about 10 times a total bit-cell capacitance of the random access memory.

11. The memory device according to claim 1, wherein switches for coupling the capacitor in reverse polarity are sized for $3\tau$ (tau).

12. A microcontroller comprising a memory device according to claim 2, wherein the microcontroller forms the embedded system.

13. A hardware security module coupled with a memory device according to claim 2.

14. A method for operating a memory device, comprising:
supplying a random access memory with a supply voltage via a switch matrix, wherein the switch matrix comprises a power supply input, a power supply output and a capacitor being charged by the supply voltage;
receiving a control signal indicating to erase the memory, and
upon receipt of the control signal to erase the memory, decoupling the capacitor from the power supply and the random access memory through the switch matrix and thereafter coupling the capacitor with the power supply output in reverse polarity.

15. The method according to claim 14, wherein the random access memory is a secure random access memory within an embedded system.

16. The method according to claim 14, wherein the switch matrix comprises a first set of switches coupling the capacitor with the power supply input and a second set of switches for coupling the capacitor with the power supply output, wherein the second set of switches comprises a first pair of switches configured to couple the capacitor with the power supply output in a first polarity and a second pair of switches configured to couple the capacitor with the power supply output in a second polarity, wherein the second polarity is a reverse polarity with respect to the first polarity.

17. The method according to claim 16, further comprising when the control signal is not received, controlling the first set of switches and the first pair of switches of the second set of switches to be closed while keeping the second pair of switches of the second set of switches open.

18. The method according to claim 17, wherein upon receiving the control signal, controlling the first pair of switches of the second set of switches and the first set of switches to open and thereafter to close the second pair of switches of the second set of switches.

19. The method according to claim 18, wherein switches of the second set of switches are controlled by a single switch control signal, wherein the first pair of switches is designed to operate faster than the second pair of switches.

20. The method according to claim 18, wherein the first pair of switches is controlled by a first switch control signal and the second pair of switches is controlled by a second switch control signal, wherein for reversing a polarity of the capacitor, the first switch control signal is asserted before the second switch control signal.

21. The method according to claim 18, wherein switches of the first set of switches are controlled to open after the first pair of switches of the second set of switches are controlled to open.

22. The method according to claim 14, wherein the capacitor has a capacitance of about 10 times a total bit-cell capacitance of the random access memory.

23. The method according to claim 14, wherein switches for coupling the capacitor in reverse polarity are sized for $3\tau$ (tau).

* * * * *